United States Patent

Mori et al.

[11] Patent Number: 5,917,649
[45] Date of Patent: Jun. 29, 1999

[54] DEVICE AND A METHOD FOR EVALUATING AN OPTICAL AMPLIFIER

[75] Inventors: Tohru Mori, Tokyo; Masafumi Koga, Yokosuka, both of Japan

[73] Assignees: Ando Electric Co., Ltd, Tokyo, Japan; Nippon Telegraph and Telephone Corporation, Tokyo, Japan

[21] Appl. No.: 08/794,244

[22] Filed: Jan. 31, 1997

[30] Foreign Application Priority Data

Feb. 7, 1996 [JP] Japan ................................ 8-021517

[51] Int. Cl.$^6$ .............................. H01S 3/00; G01N 21/00
[52] U.S. Cl. .......................................... 359/341; 356/73.1
[58] Field of Search .................................. 359/341, 344, 359/110; 356/73.1

[56] References Cited

U.S. PATENT DOCUMENTS

| | | | |
|---|---|---|---|
| 5,521,751 | 5/1996 | Aida et al. | 359/337 |
| 5,654,816 | 8/1997 | Fishman | 359/177 |

*Primary Examiner*—Mark Hellner
*Attorney, Agent, or Firm*—Finnegan, Henderson, Farabow, Garrett & Dunner, L.L.P.

[57] ABSTRACT

An optical amplifier evaluating device has a wavelength multiplex signal light generating section, and an O/E converter, and a frequency discriminating and power detecting device, and a computing section. The wavelength multiplex signal light generating section generates an wavelength multiplex signal light which includes signal lights having different wavelengths and having intensity envelopes modulated by different modulation frequencies which are enough higher than an atom life time in a high energy level or a carrier life time in an amplification medium of an optical amplifier to be evaluated, and supplies the wavelength multiplex signal light to the optical amplifier. The O/E converter converts an output light of the optical amplifier to an electric signal. The frequency discriminating and power detecting section detects signal powers of frequency spectrums which are included in the electric signal and respectively correspond to the modulation frequencies of the signal lights, and detects a noise power of the electric signal at a frequency band which is apart from the modulation frequencies. The computing section determines gains and noise figures of the wavelength multiplex amplification by the optical amplifier based on the signal powers and the noise power wavelength by wavelength.

12 Claims, 13 Drawing Sheets

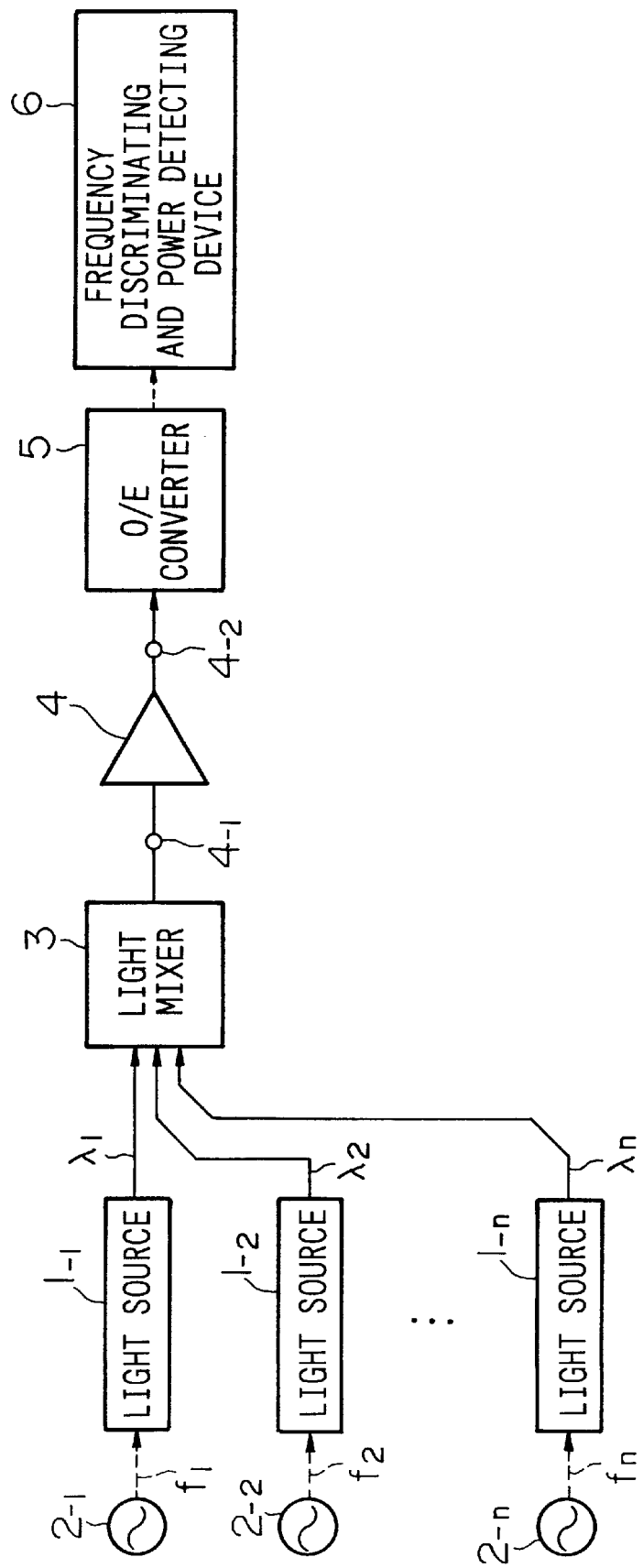

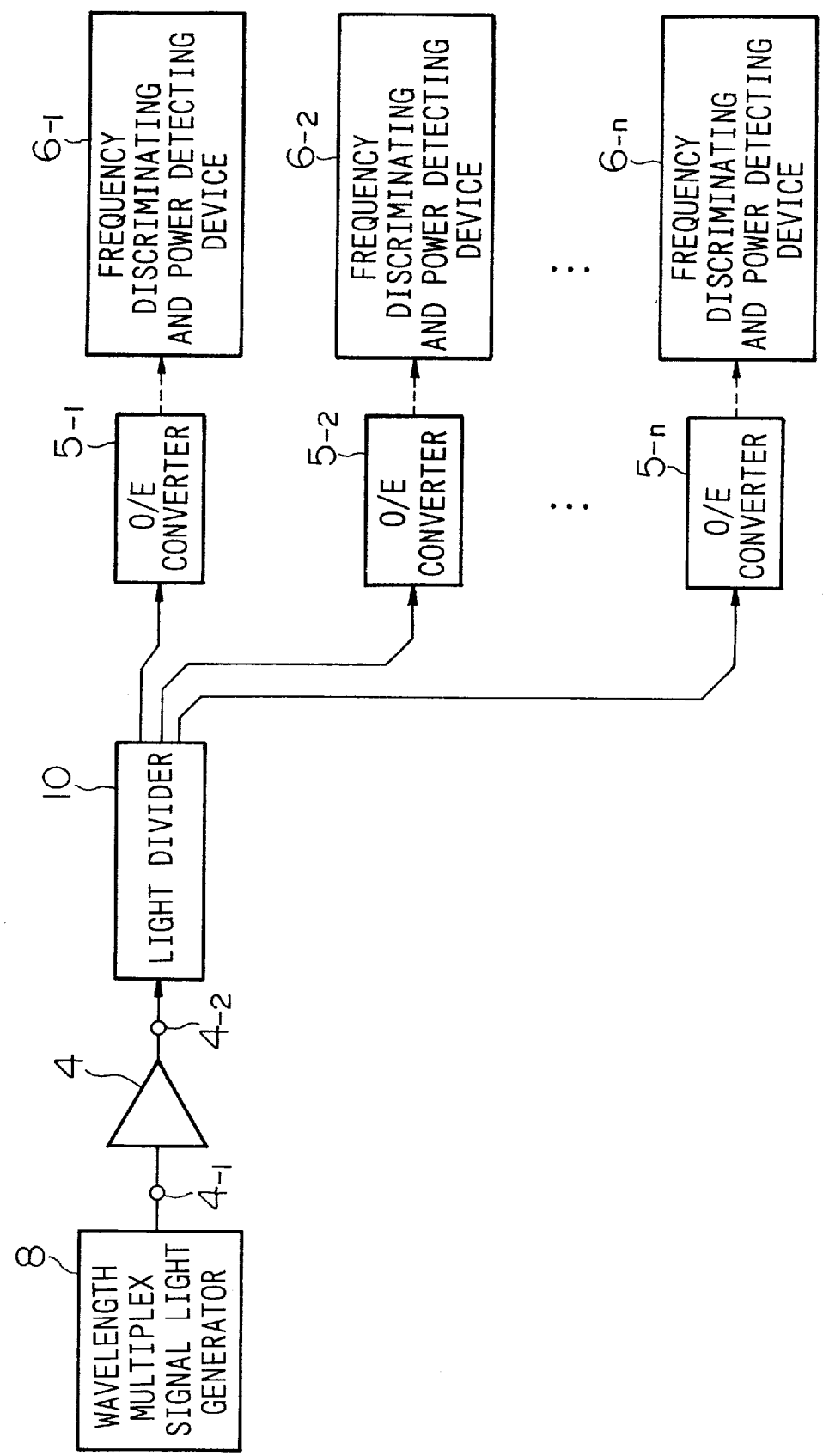

DEVICE AND A METHOD FOR EVALUATING AN OPTICAL AMPLIFIER

BACKGROUND OF THE INVENTION

1. Field of the Invention

The present invention relates to a device and a method for evaluating amplification characteristics of optical amplifiers, particularly to a device and a method for evaluating gains and noise figures of optical amplifiers which carry out wavelength multiplex amplification.

2. Background Art

Semiconductor optical amplifiers are known as a representative example of an optical amplifier which is presently studied. The semiconductor optical amplifier is made up of a semiconductor laser oscillator which has a laser light output surface covered with a special anti-reflection coat to suppress the oscillation.

As an another example, there is an optical fiber amplifier which is made up of an optical fiber in which a rare earth element such as an erbium and an praseodymium is doped.

In the optical fiber amplifier, when an excitation light is inputted in the optical fiber in which a rare earth element is doped, a population inversion is formed among different energy levels of the rare earth element. If a signal light is inputted to the optical fiber and the signal light has an energy corresponding to an energy difference between energy levels of the rare earth element which is in a population inversion state, a stimulated emission is caused in the optical fiber by the signal light and an amplified signal light is obtained by the stimulated emission. In this amplification, an ASE (Amplified Spontaneous Emission) light having spectrums in a broad band is outputted from the optical fiber amplifier together with the amplified signal light.

Next, the description will be given with respect to noises included in output lights of optical amplifiers.

In an optical amplifier, an average photon number $\langle N_0 \rangle$ of an output light of the optical amplifier is defined as follows:

$$\langle N_0 \rangle = G \langle Ni \rangle + (G-1) mt \, n_{sp} \Delta v \tag{1}$$

Furthermore, the variance $\Sigma_0$ of the photon number is defined as follows:

$$\Sigma_0^2 = \tag{2}$$
$$G\langle Ni \rangle + (G-1)mt\, n_{sp}\Delta v + 2G(G-1)n_{sp}\langle N_i\rangle + (G-1)^2 mt\, n_{sp}^2 \Delta v$$

In the above equations, G is a gain of the optical amplifier, and $\langle N_i \rangle$ is the average photon number of an input light of the optical amplifier, and $n_{sp}$ is a population inversion parameter, and $\Delta v$ is a light frequency band width of an ASE light included in an output light of the optical amplifier. Furthermore, mt is a transversal mode number of ASE light. In the case of polarization independent optical amplifiers, mt is 2. In the case of semiconductor laser amplifiers, mt is 1.

In the equation (1), the first term defines an amplified signal light included in the output light and the second term defines the ASE light included in the output light. In the equation (2), the first term defines a shot noise of the amplified signal light, and the second term defines a shot noise of the ASE light, and the third term defines a beat noise which is caused between the signal light and the ASE light, and the fourth term defines a beat noise which is caused by different spectrums of the ASE light.

The noise figure F of the optical amplifier is defined by a ratio of a S/N ratio $(S/N)_{in}$ of the input signal of the optical amplifier and a S/N ratio $(S/N)_{out}$ of the output signal as follows:

$$F = (S/N)_{in}/(S/N)_{out} \tag{3}$$

In the equation (3), each S/N ratio is determined as follows:

$$S/N = e^2 \langle N_{sig} \rangle / (2e^2 \Sigma^2 Be) \tag{4}$$

In the above equation (4), e is an electric charge of an electron, and Be is an equivalent noise band width of an O/E (Optical/Electrical) converter which receives the input or output light of the optical amplifier, and $\langle N_{sig} \rangle$ is an average photon number of the input light, and $\Sigma^2$ is a variance of the photon number.

The ratio $(S/N)_{in}$ of the equation (3) can be obtained by calculating $\langle N_0 \rangle$ of the equation (1) at G=1 and $\Sigma^2$ of the equation (2) at G=1, and by calculating the S/N of the equation (4) using the $\langle N_0 \rangle$ and $\Sigma_0^2$ thus calculated instead of the $\langle N_{sig} \rangle$ and the $\Sigma^2$. On the other hand, the ratio $(S/N)_{out}$ can be obtained by entering the $\langle N_0 \rangle$ of the equation (1) and the $\Sigma_0^2$ of the equation (2) into the equation (4) instead of the $\langle N_{sig} \rangle$ and the $\Sigma^2$.

The noise figure F of the optical amplifier is obtained by entering the $(S/N)_{in}$ and the $(S/N)_{out}$ thus obtained into the equation (3) as follows:

$$F = (1/G) + (G-1)mt\, n_{sp}\Delta v / (G^2 \langle N_i \rangle) + \tag{5}$$
$$2(G-1)mt\, n_{sp}\Delta v / G + (G-1)^2 mt\, n_{sp}^2 \Delta v / (G^2 \langle N_i \rangle)$$

In the above equation (5), the population inversion parameter $n_{sp}$ and the average input photon number $\langle N_i \rangle$ are defined as follows:

$$n_{sp} = P_{ASE}/(hv(G-1)mt\Delta v) \tag{6}$$

$$\langle N_i \rangle = P_{in}/(hv) \tag{7}$$

In the above equations, $P_{ASE}$ is a total light power of the whole ASE light, and h is a Planck's constant, and v is a frequency of the signal light, and $P_{in}$ is a light power of the input signal light.

In the case of an optical fiber amplifier, the number mt of the transversal modes of the ASE light is 2. Therefore, the equation (5) is rewritten as follows:

$$F = \tag{8}$$
$$(1/G) + (P_{ASE}/(G^2 P_{in})) + P_{ASES}/(hvG\Delta vs) + P_{ASE}^2 / (2hvG^2 P_{in}\Delta v)$$

In the above equation (8), $P_{ASES}$ is a light power of the ASE light at the light frequency of the signal light and $\Delta vs$ is a light frequency band of a light receiver for receiving the output light of the optical amplifier and for determining the $P_{ASES}$.

Next, the description will be given with respect to a conventional technique for evaluating an optical amplifier which amplifies a signal light and outputs an amplified signal light with a noise as described above.

FIG. 12A is a block diagram showing the configuration of a conventional device for evaluating a noise figure of an optical amplifier which amplifies a signal light having a single wavelength or a multiplex wavelength signal light.

In FIG. 12A, light sources $101_{-1}$, $101_{-2}$, . . . , $101_{-n}$ respectively generate signal lights respectively having wavelengths $\lambda_{-1}, \lambda_{-2}, \ldots, \lambda_{-n}$. The signal lights generated by the light sources $101_{-1}, 101_{-2}, \ldots, 101_{-n}$ are mixed by a light mixer 102 to generate an wavelength multiplex signal light. The wavelength multiplex signal light thus generated is then supplied to an optical amplifier 103, the characteristics of which are to be determined. FIG. 12B shows an example of light spectrums of this wavelength multiplex signal light supplied to the optical amplifier 103. The wavelength multiplex signal light is amplified by the optical amplifier 103 and the output light of the optical amplifier 103 is analyzed by an optical spectrum analyzer 104.

In the conventional art, a noise figure of the optical amplifier is determined based on a spectrum distribution of spectrums of the output light which is analyzed by the spectrum analyzer 104.

FIG. 12C shows light spectrum of the output light of the optical amplifier 103. As shown in FIG. 12C, the output light of the optical amplifier 103 includes a broad band ASE light and the ASE light has a very complex spectrum distribution. Thus, it is difficult to determine the second item and the fourth item of the equation (8). Therefore, the noise figure F of the optical amplifier 103 is approximately calculated taking the shot noise of the signal light and the beat noise caused due to the signal light and the ASE light in account and ignoring the second item and the fourth item of the equation (8). The equation for approximately calculating the noise figure F is as follows:

$$F \approx (1/G) + (P_{ASE}/(h\nu G\Delta\nu s)) \tag{9}$$

If the optical amplifier 103 has a gain G and the output light of the optical amplifier 103 has a light power $P_{out}$, the gain G is defined as follows:

$$G = (P_{out} - P_{ASE})/P_{in} \tag{10}$$

In order to determine noise figures of the wavelength multiplex amplification, it is necessary to determine the parameters defined in the equations (9) and (10) for the wavelengths of the signal lights which constitute the wavelength multiplex signal light. The noise figure F can be calculated wavelength by wavelength using the parameters thus determined.

In the conventional method, however, the noise figure F of the wavelength multiplex amplification is approximated by taking only the shot noise of the signal light and the beat noise caused due to the signal light and the ASE light. Therefore, the method is not to evaluate the optical amplifier which actually operates as a wavelength multiplex amplifier.

Furthermore, the conventional method for evaluating noise figures of wavelength multiplex amplification requires to determine powers of the ASE light at the wavelengths of the signal lights. However, it is difficult to determine the powers.

The description will be given with respect to this problem. FIG. 13A shows an example of light powers $P_{in-1}, P_{in-2}, \ldots, P_{in-n}$ of spectrums of an wavelength multiplex signal light inputted to the optical amplifier 103 which respectively correspond to wavelengths $\lambda_1, \lambda_2, \ldots, \lambda_n$. FIG. 13B shows an example of light powers $P_{out-1}, P_{out-2}, \ldots, P_{out-n}$ of spectrums of amplified signal lights outputted from the optical amplifier 103 which respectively correspond to the wavelengths $\lambda_1, \lambda_2, \ldots, \lambda_n$. These light powers of the spectrums may be easily measured by an optical spectrum analyzer.

However, it is impossible to directly determine the light powers $P_{ASES-1}, P_{ASES-2}, \ldots, P_{ASES-n}$ of the ASE light corresponding to the wavelengths $\lambda_1, \lambda_2, \ldots, \lambda_n$ because the ASE light is outputted from the optical amplifier together with the amplified signal lights and the light powers of the ASE light at the wavelengths $\lambda_1, \lambda_2, \ldots, \lambda_n$ are buried in the light powers the the amplified signal lights.

In order to obtain the light powers $P_{ASES-1}, P_{ASES-2}, \ldots, P_{ASES-n}$ of the ASE light, it is necessary to determine the light powers of the output light of the optical amplifier at wavelengths neighboring the wavelengths $\lambda_1, \lambda_2, \ldots, \lambda_n$ and to interpolate the light powers $P_{ASES-1}, P_{ASES-2}, \ldots, P_{ASES-n}$ based on the light powers at the neighboring wavelengths as shown in FIG. 14.

However, such a manual operation is difficult and labor. Furthermore, the analysis by the spectrum analyzer is influenced by a stray light. Therefore, it is difficult to accurately interpolate the light powers $P_{ASES-1}, P_{ASES-2}, \ldots, P_{ASES-n}$.

There is a method to suppress the input signal light of the optical amplifier by using a light polarization controller and a polarizer in order to improve the accuracy of the interpolation of the ASE light powers $P_{ASE-1}, P_{ASE-2}, \ldots, P_{ASE-n}$ or to reduce the influence due to a stray light. However, it is difficult to accurately determine the ASE light powers even if the method is used.

Furthermore, the influence of the stray light is increased when the steps between the wavelengths of the multiplexed signal lights are very short or less than the resolution of the optical spectrum analyzer as shown in FIG. 15. Thus, the measurement error of the ASE light powers is increased due to the influence. Therefore, it is very difficult to accurately and smoothly determine the wavelength multiplex amplification characteristics of the optical amplifier.

SUMMARY OF THE INVENTION

Accordingly, it is an object of the present invention to provide a device and a method which can accurately and automatically evaluating gains and noise figures of wavelength multiplex amplification by an optical amplifier in a condition as same as that of an actual wavelength multiplex light communication system.

In an aspect of the present invention, there is provided an optical amplifier evaluating device comprising light generating means for generating a wavelength multiplex signal light which includes a plurality of signal lights having different wavelengths and having intensity envelopes modulated by different modulation frequencies which are enough higher than an atom life time in a high energy level or a carrier life time in an amplification medium of an optical amplifier to be evaluated, and for supplying the wavelength multiplex signal light to the optical amplifier; O/E conversion means for converting an output light of the optical amplifier to an electric signal; frequency discriminating and power detecting means for detecting signal powers of frequency spectrums which are included in the electric signal and respectively correspond to the modulation frequencies of the signal lights, and for detecting a noise power of the electric signal at a frequency band which is apart from the modulation frequencies, and for outputting the signal powers and the noise power as parameters for evaluating gains and noise figures of an wavelength multiplex amplification by the optical amplifier.

The present invention further provides an optical amplifier evaluating method comprising the steps of generating a wavelength multiplex signal light which includes a plurality of signal lights having different wavelengths and having intensity envelopes modulated by different modulation frequencies which are enough higher than an atom life time in a high energy level or a carrier life time in an amplification medium of an optical amplifier to be evaluated; supplying the wavelength multiplex signal light to the optical amplifier; converting an output light of the optical amplifier to an electric signal; detecting signal powers of frequency spectrums which are included in the electric signal and respectively correspond to the modulation frequencies of the signal lights; detecting a noise power of the electric signal at a frequency band which is apart from the modulation frequencies; determining gains and noise figures of an wavelength multiplex amplification by the optical amplifier based on the signal powers and the noise power wavelength by wavelength.

BRIEF DESCRIPTION OF THE DRAWINGS

FIG. 1 is a block diagram showing a configuration of an optical amplifier evaluating device according to a first preferred embodiment of the present invention.

FIG. 9 is a block diagram showing a configuration of an optical amplifier evaluating device according to a third preferred embodiment of the present invention.

DETAILED DESCRIPTION OF THE PREFERRED EMBODIMENTS

A. FIRST PREFERRED EMBODIMENT

Figure 2A:
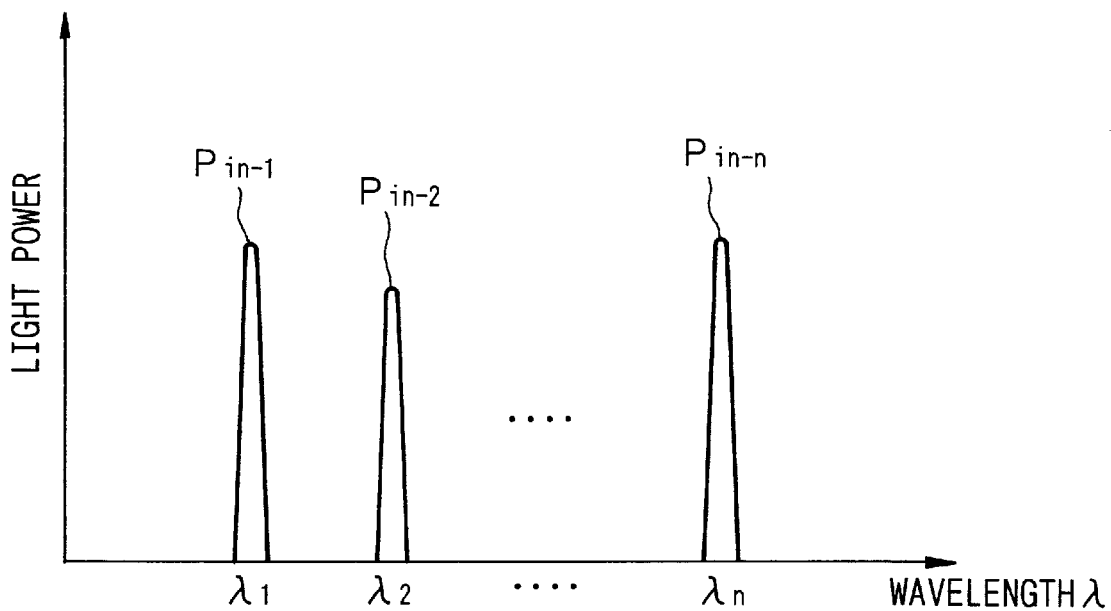
FIG. 2A shows wavelength spectrums of an wavelength multiplex signal light supplied to an optical amplifier to be evaluated.

[1] Configuration Of Preferred Embodiment (a) Overall Configuration

FIG. 1 is a block diagram showing the configuration of an optical amplifier evaluating device according to a first preferred embodiment of the present invention.

The role of the evaluating device is to evaluate characteristics of wavelength multiplex amplification by optical amplifiers such as an optical fiber amplifier or a optical semiconductor amplifier.

As described above, optical fiber amplifiers include an optical fiber having a core doped with a rare earth element such as an erbium or an praseodymium. In the optical fiber amplifier, an excitation light which has a different wavelength from the signal light is supplied to the optical fiber to excite the optical fiber. When a signal light is inputted to the optical fiber thus excited, the signal light is amplified. The semiconductor optical amplifiers are to directly amplify the signal light.

As shown in FIG. 1, the optical amplifier evaluating device according to the preferred embodiment includes light sources $1_{-1}, 1_{-2}, \ldots, 1_{-n}$, and modulation signal generators $2_{-1}, 2_{-2}, \ldots, 2_{-n}$, and a light mixer 3, and an O/E converter 5, and a frequency discriminating and a power detecting device 6, and a computing section (the illustration is omitted).

(b) Wavelength Multiplex Signal Light Generating Means

In FIG. 1, the light sources $1_{-1}, 1_{-2}, \ldots, 1_{-n}$, and the modulation signal generators $2_{-1}, 2_{-2}, \ldots, 2_{-n}$, and the light mixer 3 constitute an wavelength multiplex signal light generating means for generating an wavelength multiplex signal light having signal lights which have different wavelengths and different intensity envelopes modulated by different modulation frequencies.

More specifically, the light sources $1_{-1}, 1_{-2}, \ldots, 1_{-n}$ respectively oscillate at different wavelengths $\lambda_1, \lambda_2, \ldots, \lambda_n$ DFB-LDs (Distribution Feed Back Laser Diodes) which oscillate in a single mode at different center wavelengths or TLSs which can control the wavelengths of the output light may be preferable for these light sources.

The modulation signal generators $2_{-1}, 2_{-2}, \ldots, 2_{-n}$ are respectively connected to the light sources $1_{-1}, 1_{-2}, \ldots, 1_{-n}$. The modulation signal generators respectively generate sine wave modulation signals which have different modulation frequencies $f_1, f_2, \ldots, f_n$ to modulate the intensities of output signal lights of the light sources.

In this evaluation device, the modulation frequencies applied to the intensity modulation of the signal lights are determined so as to be higher than a frequency corresponding to a signal extinct time constant of an amplification medium of an optical amplifier which is to be evaluated.

If an optical amplifier to be evaluated is an optical fiber amplifier which has a core doped with a rare earth element, the extinct time constant depends on an atom life time in the high energy level. In this case, therefore, the modulation frequencies are determined so as to be more than 10 kHz. If the optical amplifier to be evaluated is a semiconductor amplifier, the extinct time constant depends on the carrier life time in the semiconductor. In this case, therefore, the modulation frequencies are determined so as to be more than 1 GHz.

Under the intensity modulation by the modulation signal generators, the light sources $1_{-1}, 1_{-2}, \ldots, 1_{-n}$ respectively generate signal lights having different wavelengths $\lambda_1$, $\lambda_2$, ..., $\lambda_n$ and having different intensity envelopes modulated by different modulation frequencies $f_1$, $f_2$, ..., $f_n$.

These signal lights are mixed by the light mixer 3. As a result, an wavelength multiplex signal light including these signal lights is generated by the light mixer 3. The wavelength multiplex signal light thus generated is supplied to an optical amplifier 4, the characteristic of which is to be determined, via an input-side terminal $4_{-1}$ of the evaluating device.

(c) Optical Amplifier To Be Evaluated

The wavelength multiplex signal light is amplified by the optical amplifier 4 which is to be evaluated. The wavelength multiplex signal light thus amplified includes the signal lights which has different wavelengths and different intensity envelopes modulated by different modulation frequencies. Furthermore, the modulation frequencies applied to the intensity modulation of the input signal lights of the optical amplifier are higher than a frequency corresponding to a signal extinct time constant of an amplification medium of the optical amplifier. Therefore, the signal lights are independently amplified not so as to interact.

The detailed description will be given with respect to this effect.

If a signal light modulated by such a high frequency as described above is amplified by an optical amplifier, the directive component of the signal light is not only amplified but also the alternative component (modulated signal component) of the signal light is amplified. This effect exists when a plurality of signal lights having different wavelengths are simultaneously amplified by the optical amplifier. In this case, the signal lights having different wavelengths are independently amplified not so as to interact even if the intensities of the signal lights are modulated by different modulation frequencies.

Therefore, the gains of the wavelength multiplex amplification by the optical amplifier wavelength by wavelength can be determined by determining differences between the signal powers of the alternative components (modulation signal powers) of the input signal and those of the output signal frequency by frequency.

The preferred embodiment is to determine gains and noise figures of wavelength multiplex amplification by the optical amplifier 4 by taking advantage of this effect.

(d) O/E Converter

The O/E converter 5 receives an output light of the optical amplifier 4 via an output-side terminal $4_{-2}$ of the evaluating device.

The output light thus received includes amplified signal lights corresponding to the wavelength multiplex signal light, and an ASE light having a plurality of wavelength spectrums in a broad band.

The O/E converter 5 converts this output light to an electric signal.

In this conversion, shot noises corresponding to the amplified signal lights are generated wavelength by wavelength and a shot noise corresponding the ASE light is generated.

Furthermore, when the amplified signal lights and the ASE light having a plurality of spectrums are converted to an electric signal, a mixing of signals of these lights is carried out. As a result, beat noises are generated by mixing of different wavelength signal lights, and by mixing of the signal light and the ASE light, and by mixing of different spectrums of the ASE light.

Therefore, an electric signal including signals corresponding to the amplified signal lights and a noise including the shot noises and the beat noises described above are outputted from the O/E converter 5.

Such a noise is also generated in actual wavelength multiplex light communication systems. In these systems, O/E converters are often provided for respectively receiving signal lights, which are included in a received wavelength multiplex signal light. Furthermore, optical BPFs (Band Pass Filters), the middle wavelengths of the pass bands of which correspond to the wavelengths of the amplified signal lights, are provided in front of the O/E converters in order to reduce the powers of the noises.

In the evaluating device according to the preferred embodiment, in order to determine gains and noise figures of the optical amplifier 4, the optical amplifier carries out an wavelength multiplex amplification closed to that which is carried out in actual wavelength multiplex light communication systems. Therefore, gains and noise figures closed to actual gains and noise figures of the wavelength multiplex amplification are determined.

(e) Frequency Discriminating And Power Detecting Device And Computing Section

The frequency discriminating and power detecting device 6 detects parameters, which are to be used for calculating the gains and the noise figures, from the electric signal outputted by the O/E converter.

More specifically, the frequency discriminating and power detecting device 6 detects modulation signal powers $P_{emodout-1}$, $P_{emodout-2}$, ..., $P_{emodout-n}$ and a total noise power $N_{total}$ from the output electric signal of the O/E converter 5.

The modulation signal powers $P_{emodout-1}$, $P_{emodout-2}$, ..., $P_{emodout-n}$ are powers of signals which are included in the electric signal and have signal frequencies respectively corresponding to the modulation frequencies $f_1$, $f_2$, ..., $f_n$. These signals correspond to the above-described alternative components of the amplified signal lights which have different wavelengths and different intensity envelopes. The modulation signal powers $P_{emodout-1}$, $P_{emodout-2}$, ..., $P_{emodout-n}$ are parameters to be used for calculating the gains of the wavelength multiplex amplification by the optical amplifier 4 wavelength by wavelength.

The total noise power $N_{total}$ is a parameter which is necessary for calculating the noise figures.

Prior to describe the noise figures, the description will be given with respect to the noises generated in the evaluating device.

As described above, the output light of the optical amplifier 4 includes the ASE light except for the amplified signal lights. This ASE light is generated by a stimulated emission in an amplification medium of the optical amplifier 4.

More specifically, a population inversion is caused between different energy levels in the amplification medium by supply of an excitation light. When a signal light having an energy corresponding to a energy between different energy levels which are in a population inversion state, excited atoms, which have been excited in the high energy level by the population inversion, fall in a ground state by a stimulated emission. However, the all atoms in the population inversion state do not fall in the ground state by the stimulated emission but a part of the atoms spontaneously fall in the ground level by a spontaneous emission. In this spontaneous emission, an incoherent ASE light which is different from the amplified signal light is emitted. The light power of the ASE light is not constant but depends on the intensity of the input light of the optical amplifier. Therefore, if the input light power is increased, the light power of the ASE light generated by the spontaneous emission is decreased.

Next, the description will be given with respect to beat noises.

If the optical amplifier 4 outputs a light including an amplified signal light and an ASE light, and the output light is converted to an electric signal by the O/E converter 5, the following beat noises are generated in a broad band by a mixing.

a. beat noises generated by mixing of the signal light and spectrums of the ASE light b. beat noises generated by mixing of different spectrums of the ASE light.

When the signal power of the input light is low, the S/N ratio of the output signal of the O/E converter depends on the power of the noises b, whereas when the signal power is high, the S/N ratio depends on the noises a.

In the wavelength multiplex amplification, the optical amplifier outputs the amplified signal lights having different wavelengths and an ASE light including spectrums in a broad band. Therefore, the following beat noises are generated when the output light of the optical amplifier is converted to an electric signal.

a'. beat noises generated by mixing of signal lights and spectrums of the ASE light b'. beat noises generated by mixing of different spectrums of the ASE light.

c'. beat noises generated by mixing of different wavelength signal lights

In the above noises, the beat noises c' have a broad band. Therefore, it is difficult to separately detect the beat noises.

In the actual wavelength multiplex light communication system, receivers are provided for signal lights included in a received wavelength multiplex signal light. Each receiver may receive a signal light having a single wavelength. Therefore, optical BPFs having narrow pass bands, the center wavelength of correspond to signal lights to be received, are respectively provided in front of the receivers. The S/N ratio of the output signal of each receiver depends on the powers of the above-described noises a. In this case, the powers of the noises b are low.

In the evaluating device, a total intensity noise including beat noises generated by mixing of the signal lights and the spectrums of the ASE light, and beat noises generated by mixing of different spectrums of the ASE light, the shot noises corresponding to the signal lights, and the shot noises corresponding to the ASE light is determined as the total noise power $N_{total}$ as described above.

That is to say, the frequency discriminating and power detecting device 6 detects a noise power of the output signal of the O/E converter at a frequency band which is apart from the modulation frequencies. This detected noise power is used as the power of the total intensity noise, i.e., the total noise power $N_{total}$.

The computing section determines gains and noise figures of a wavelength multiplex amplification by the optical amplifier wavelength by wavelength based on the signal powers and the total noise power detected by the frequency discriminating and power detecting device 6.

Meanwhile, the signal lights inputted to the optical amplifier 5 have relative intensity noises. These relative intensity noises are generated by the light sources 2-1, 2-2, . . . , 2-n, and are to be removed in the evaluation of the noise figures of the optical amplifier 4.

In the evaluating device, the computing section corrects the total noise power based on the relative intensity noises of the light sources when determining the noise figures.

[2] Operation Of Preferred Embodiment

Next, the operation of the first preferred embodiment will be described.

FIG. 2A shows wavelength spectrums of a light power of an wavelength multiplex signal light inputted to the optical amplifier 4.

As described above, the input wavelength multiplex signal light includes signal lights which are respectively generated by the light sources $2_{-1}, 2_{-2}, \ldots, 2_{-n}$ and these signal lights respectively have the wavelengths $\lambda_1, \lambda_2, \ldots, \lambda_n$.

Therefore, these wavelength spectrums respectively have light powers $P_{in-1}, P_{in-2}, \ldots, P_{in-n}$, as shown in FIG. 2A, are included in the wavelength multiplex signal light.

Figure 2B:
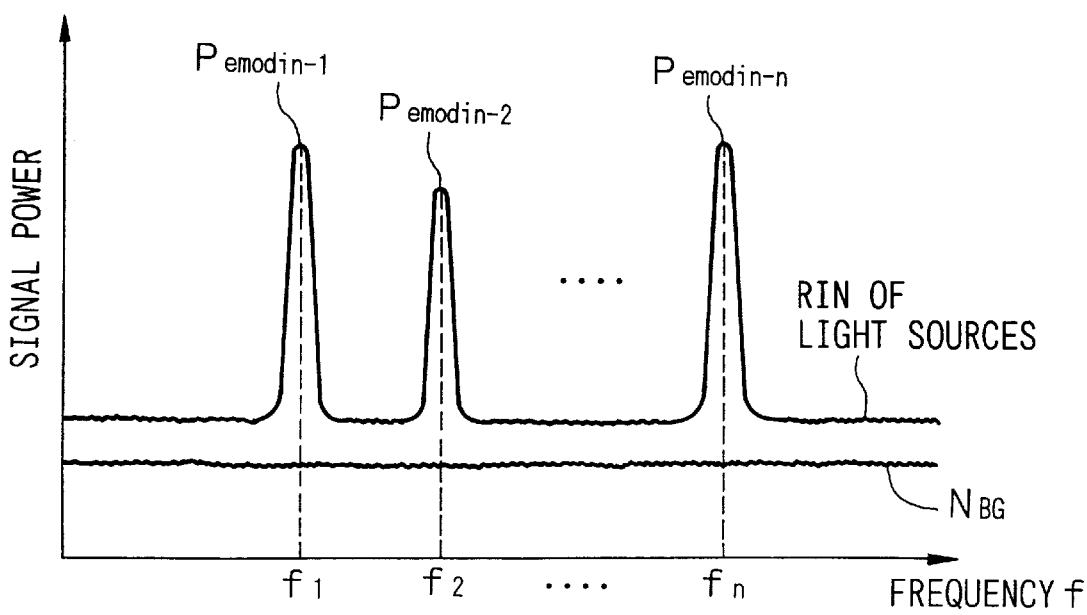
FIG. 2B shows frequency spectrums of a signal power of the wavelength multiplex signal light.

FIG. 2B shows frequency spectrums of a signal power of the wavelength multiplex signal light inputted to the optical amplifier 4.

In the input wavelength multiplex signal light, the intensity of the signal lights having the wavelengths $\lambda_1, \lambda_2, \ldots, \lambda_n$ are respectively modulated by the modulation frequencies $f_1, f_2, \ldots, f_n$. In the other word, these signal lights respectively have alternative components which respectively have frequencies $f_1, f_2, \ldots, f_n$.

In the example shown in FIG. 2B, the alternative components corresponding to the modulation frequencies $f_1, f_2, \ldots, f_n$ have modulation signal powers $P_{emodin-1}, P_{emodin-2}, \ldots, P_{emodin-n}$.

Figure 3:
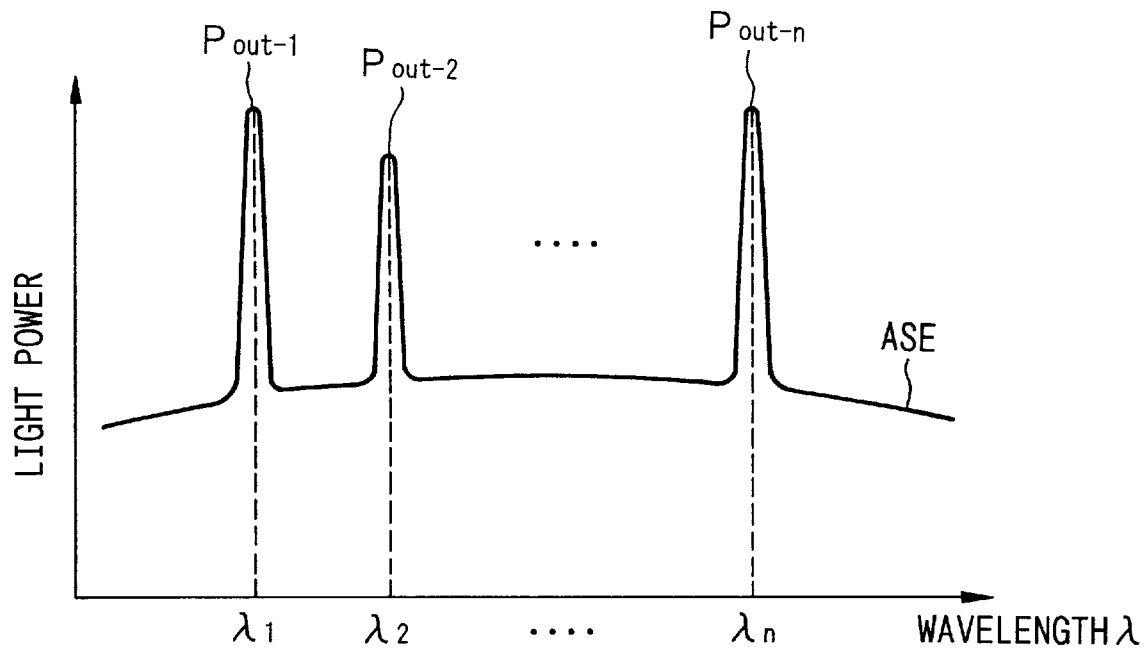
FIG. 3 shows wavelength spectrums of a light power of an output light of the optical amplifier.

The wavelength multiplex signal light is amplified by the optical amplifier 4. FIG. 3 shows wavelength spectrums of the output light of the optical amplifier 4.

The output light of the optical amplifier 4 includes amplified signal lights which correspond to the input wavelength multiplex signal light. In FIG. 3, $P_{out-1}, P_{out-2}, \ldots, P_{out-n}$ respectively designate the light powers of these amplified signal lights.

The output light of the optical amplifier 4 further includes an ASE light. As shown in FIG. 3, the ASE light has spectrums in a broad band. The ASE light is generated by a spontaneous emission and amplified in the amplification medium of the optical amplifier.

Figure 4:
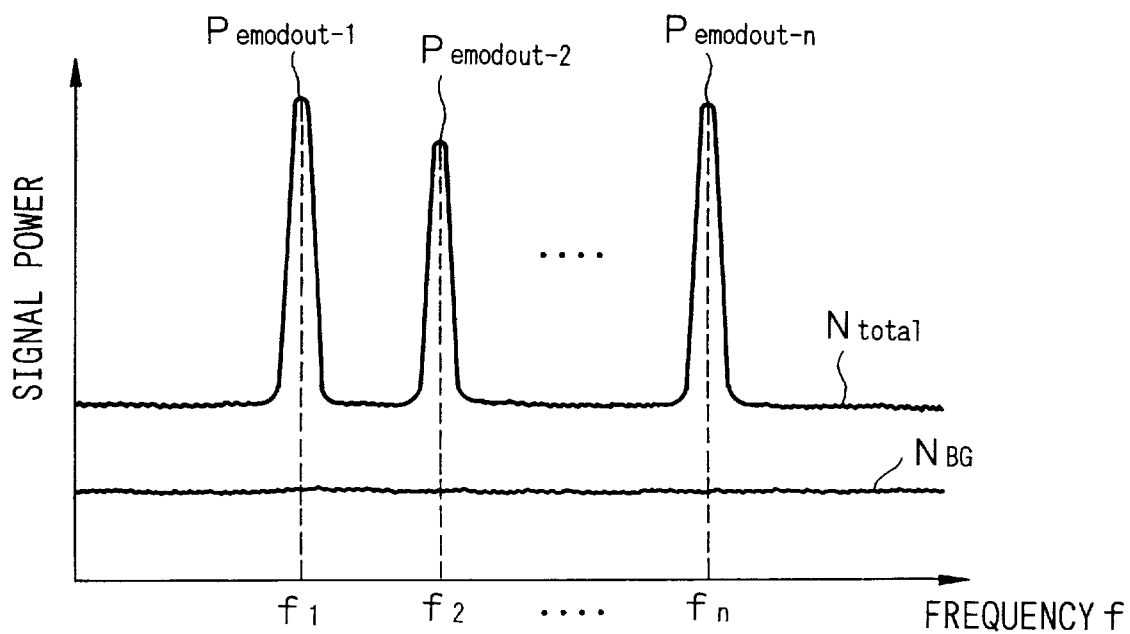
FIG. 4 shows frequency spectrums of a signal power of the output light of the optical amplifier.

The wavelength multiplex signal light supplied to the optical fiber 4 has signal lights having the wavelengths $\lambda_1, \lambda_2, \ldots, \lambda_n$ and modulated by the different modulation frequencies $f_1, f_2, \ldots, f_n$ are independently amplified by the optical amplifier 4. In the amplification by the optical amplifier 4, the both directive component and the alternative components (modulation signals) included in the signal lights are amplified, and the alternative components are independently amplified not so as to interact. Therefore, the output light of the optical amplifier 4 includes alternative components which are obtained by independently amplifying the alternative components of the input light. FIG. 4 shows frequency spectrums of a signal power of the output light of the optical amplifier.

The electric signal obtained from the O/E converter 5 includes alternative components respectively having frequencies $f_1, f_2, \ldots, f_n$. These components corresponding to the alternative components included in the output light of the optical amplifier 4.

The frequency discriminating and power detecting device 6 detects the powers of these alternative components frequency by frequency. The detected powers are the modulation signal powers $P_{emodout-1}, P_{emodout-2}, \ldots, P_{emodout-n}$ as described above. In FIG. 4, the modulation signal powers $P_{emodout-1}, P_{emodout-2}, \ldots, P_{emodout-n}$ are illustrated.

Figure 5:
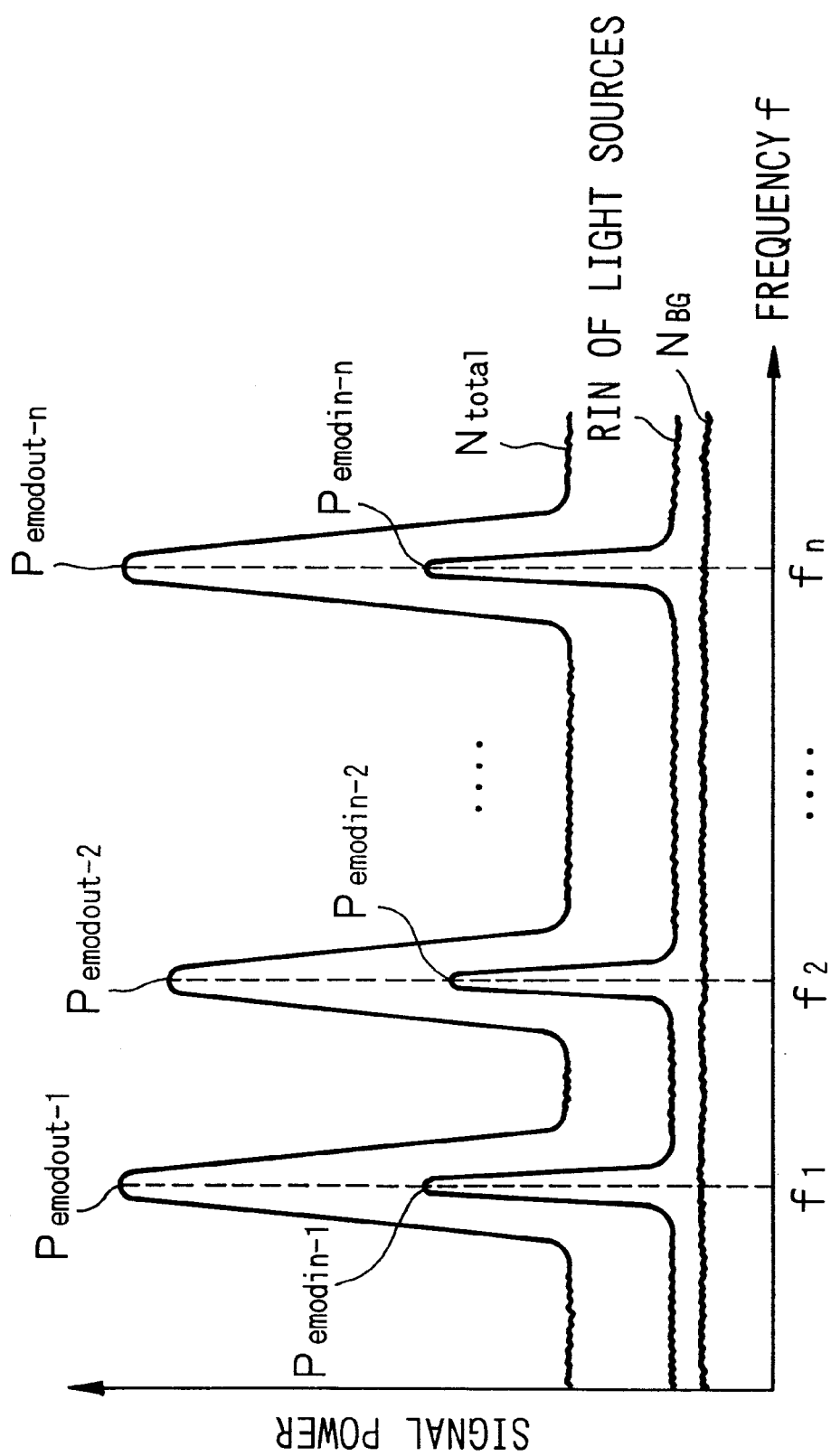
FIG. 5 shows frequency spectrums of signal powers of the input light and the output light of the optical amplifier.

FIG. 5 shows the frequency spectrums of signal powers of the input light and the output light of the optical amplifier 4. As shown in FIG. 5, the modulation signal powers $P_{emodin-1}, P_{emodin-2}, \ldots, P_{emodin-n}$ of the input light of the optical amplifier 4 respectively correspond to the modulation frequencies $f_1, f_2, \ldots, f_n$, and the modulation signal powers $P_{emodout-1}, P_{emodout-2}, \ldots, P_{emodout-n}$ of the output light also respectively correspond to the modulation frequencies $f_1, f_2, \ldots, f_n$.

The electric signal outputted from the O/E converter 5 further includes a noise including the shot noises and the beat noises which are added in the O/E conversion. The noise spectrum density $\langle i_n^2 \rangle$ of the noise added in the O/E conversion is determined as follows:

$$\langle i_n^2 \rangle = 2e(\eta e/h\nu)[GP_{in} + 2n_{sp}h\nu(G-1)\Delta\nu_{sp} + \quad (11)$$
$$4(\eta e/h\nu)^2[n_{sp}h\nu(G-1)GP_{in} + (n_{sp}h\nu(G-1))^2\Delta\nu_{sp-sp}] +$$
$$(\eta e/h\nu)^2 P_{in}^2 G^2 RIN$$

In the above equation (11), e is an electric charge of an electron, and η is a quantize efficiency of the O/E converter 4, and $\Delta\nu_{sp}$ is an equivalent noise band width of the shot noise of the ASE light, and $\Delta\nu_{sp-sp}$ is an equivalent noise band width of beat noises which are generated by mixing of different spectrums of the ASE light, and RIN is a relative intensity noise of the light source.

In the equation (11), the first item defines the shot noise of the amplified signal light, and the second item defines the shot noise of the ASE light, and the third item defines the beat noise generated due to the signal light and the ASE lights, and the fourth item defines the beat noise generated due to the ASE lights having different wavelengths. These noises are generated in the amplification by the optical amplifier 4.

However, the fifth item of the equation (11) is not a noise generated in the amplification but is an intensity noise included in the input signal light of the optical fiber 4. Therefore, the fifth item is to be rejected from the noise generated by the optical amplifier 4 in order to accurately determine the noise figures.

The frequency discriminating and power detecting device 6 detects a noise power of the output signal of the O/E converter at a frequency band which is enough apart from the modulation frequencies. This detected noise power is used as the total noise power $N_{total}$. In FIG. 5, the total noise power $N_{total}$ which is detected by the frequency discriminating and power detecting device 6 is designated.

The total noise detected by the frequency discriminating and power detecting device 6 includes and a background noise which has a power $N_{BG}$ and is generated by the frequency discriminating and power detecting device 6, except for the above-described shot noises and beat noises generated in the O/E conversion, and the total noise has the noise spectrum densities $\langle i_n^2 \rangle$ defined in the above equation (11). In FIG. 5, the power $N_{BG}$ of the background noise is designated.

As is indicated in the equation (11), the total noise power $N_{total}$ includes a power of RIN. In order to accurately determine the noise figures, this power is to be rejected from the total noise power $N_{total}$. In the preferred embodiment, the RIN of the light sources $1_{-1}, 1_{-2}, \ldots, 1_{-n}$ are previously determined prior to the evaluation of the noise figures. When calculating the noise figures wavelength by wavelengths, the power of the RIN thus determined is subtracted from the total noise power $N_{total}$. In FIGS. 2B and 5, a power of RIN of light sources is designated on a curve indicating a signal power of the output light of the optical amplifier 4.

The noise figure F of the optical amplifier 4 is determined as the ratio of the $SNR_{in}$ regarding to the shot noise of the input signal light of the optical amplifier 4 and the $SNR_{out}$ regarding to the output light of the optical amplifier 4 as follows:

$$SNR_{in} = P_{in}/(2h\nu Be) \quad (12)$$

$$SNR_{out} = (\eta e GP_{in}/h\nu)^2 / [(N_{total} - N_{BG}) - (\eta e/h\nu)^2 P_{in}^2 RIN]Be \quad (13)$$

$$F = SNR_{in}/SNR_{out} \quad (14)$$

In the above equations, Be is a receiving band width of the O/E converter 5.

The noise figure F is determined by entering the $SNR_{in}$ of the equation (12) and the $SNR_{out}$ of the equation (13) into the equation (14) as follows:

$$F = [(N_{total} - N_{BG}) - (\eta e/h\nu)^2 P_{in}^2 G^2 RIN]/[2\eta e P_{in} G^2/(h\nu)] \quad (15)$$

When a light current which flows through the O/E converter 5 and corresponds to the input light is $I_{pho}$, the $P_{in}$ of the equation (15) is defined as follows:

$$P_{in} = (h\nu/\eta e) I_{pho} \quad (16)$$

Therefore, the above equation (15) is rewritten as follows:

$$F = [(N_{total} - N_{BG}) - G^2 I_{pho}^2 RIN]/(2\eta e G^2 I_{pho}) \quad (17)$$

In the above equation (17), G is the gain of the optical amplifier 4. The gain G is defined by the modulation signal power $P_{emodin-k}$ (k=1, 2, . . . , n) of the input signal light of the optical amplifier 4 and the modulation signal power $P_{emodout-k}$ (k=1, 2, . . . , n) of the amplified signal light outputted from the optical amplifier 4 as follows:

$$G = (P_{emodout-k}/P_{emodin-k})^{1/2} \quad (18)$$

The gains of the wavelength multiplex amplification by the optical amplifier 4 can be determined by using the above equation (18) wavelength by wavelength.

In the equation (17), the parameters except for the gain G are detected by the frequency discriminating and power detecting device 6 in the evaluation or has been previously determined prior to the evaluation. Thus, the noise figures F of the wavelength multiplex amplification can be determined wavelength by wavelength according to the equation (17).

The calculation of the gains and noise figures are performed by the computing section.

[3] Modifications

There are modifications in the first preferred embodiment as follows:
(a) If it is possible to determine relative intensity noises of the input signal lights and the output signal lights of the optical amplifier 4, the noise figures can be determined by another method. That is to say, when relative intensity noises of an input light and an output light are respectively defined as $RIN_{input}$ and $RIN_{output}$, the noise figure F of the optical amplifier 4 is determined as follows:

$$F = (RIN_{output} - RIN_{input}) P_{in}/2h\nu \quad (19)$$

Figure 6:
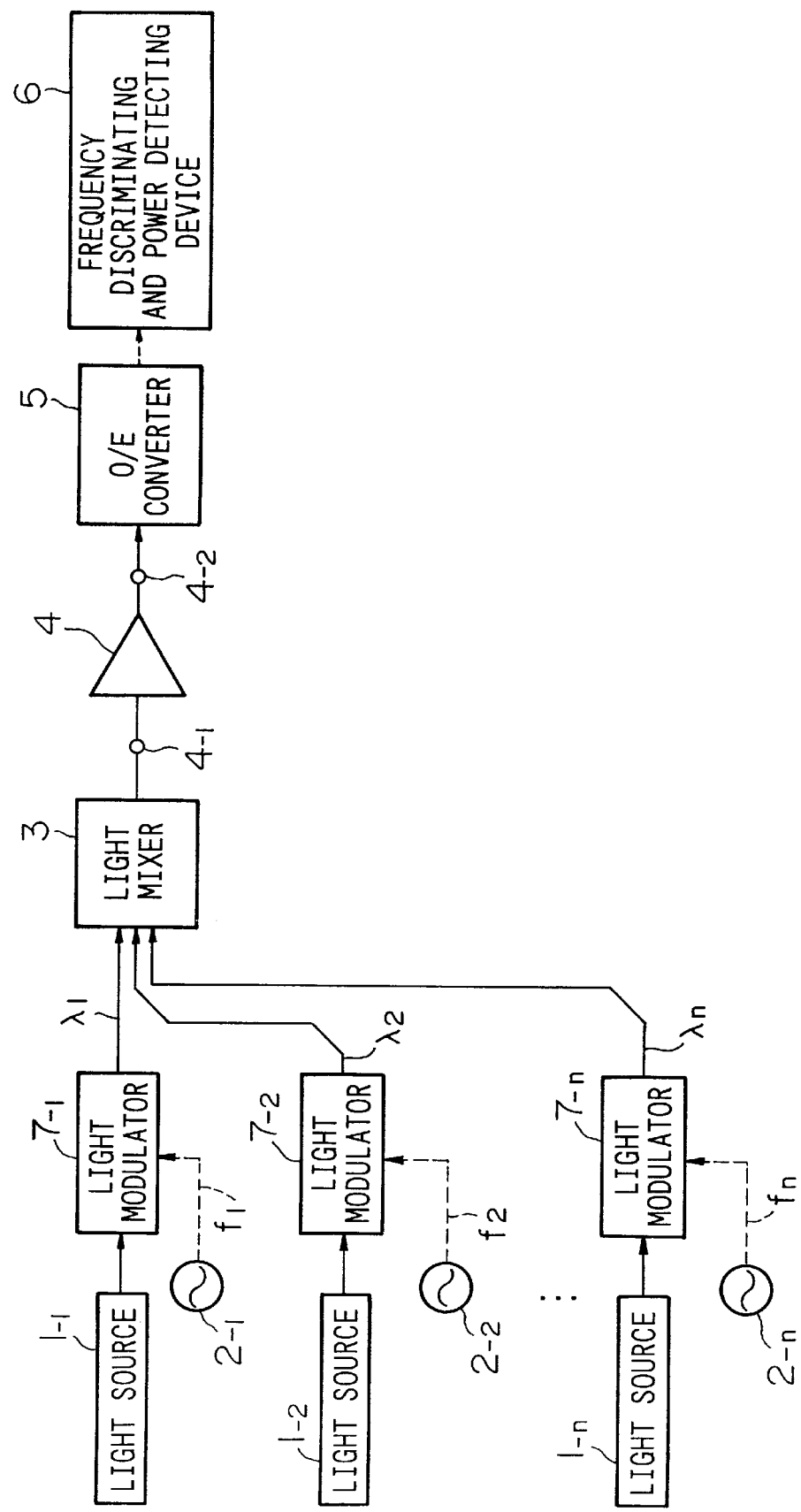
FIG. 6 is a block diagram showing the configuration of a modification of the first preferred embodiment of the present invention.

Therefore, the noise figures may be determined according to the equation (19) using the $RIN_{input}$ and $RIN_{output}$ thus determined.
(b) FIG. 6 shows a modification of the first preferred embodiment. In this modification, light sources $2_{-1}, 2_{-2}, \ldots, 2_{-n}$ respectively generates signal lights having different wavelengths and constant intensities. Light modulators $7_{-1}$, $7_{-2}, \ldots, 7_{-n}$ are provided for the light sources. These light modulators $7_{-1}, 7_{-2}, \ldots, 7_{-n}$ respectively modulate the intensities of the signal lights by the modulation signals which have different modulation frequencies and are generated by the modulation signal generators $2_{-1}, 2_{-2}, \ldots, 2_{-n}$. The modulated signal lights obtained from the light modulators are mixed by the light mixer 3 to generate a wavelength multiplex signal light which is to be supplied to the optical amplifier 4.

In this modification, operations and effects which are as same as those of the first preferred embodiment are obtained.

B. Second Preferred Embodiment

Figure 7:
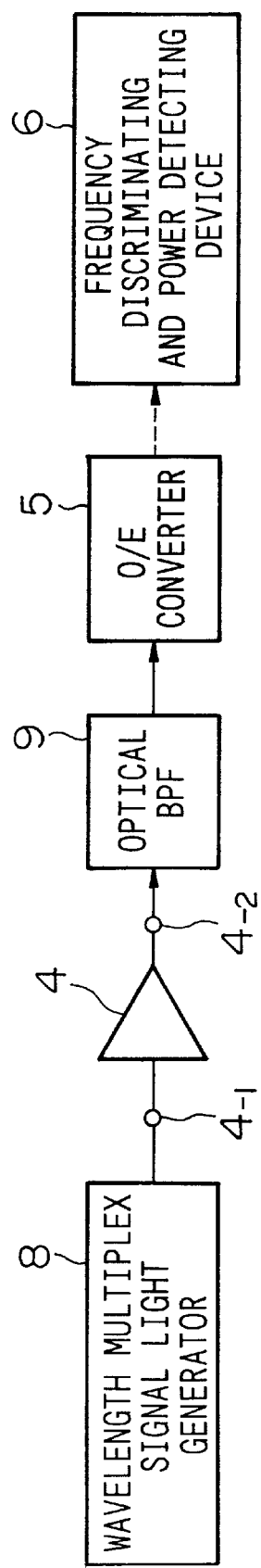
FIG. 7 is a block diagram showing a configuration of an optical amplifier evaluating device according to a second preferred embodiment of the present invention.

FIG. 7 is a block diagram showing the configuration of a a noise figure evaluating device for wavelength multiplex amplification according to a second preferred embodiment of the present invention.

In FIG. 7, an wavelength multiplex signal light generator 8 corresponds to the light sources $1_{-1}, 1_{-2}, \ldots, 1_{-n}$, and the modulation signal generator $2_{-1}, 2_{-2}, \ldots, 2_{-n}$, and the light mixer 3 of the first preferred embodiment (FIG. 1). A wavelength multiplex signal light is generated by the wavelength multiplex signal light generator 8 and is supplied to the input terminal $4_{-1}$ of the optical amplifier 4.

The output light of the optical amplifier 4 is supplied to an optical BPF 9. This BPF has a narrow pass band width and the center wavelength of the pass band corresponds to one of the wavelengths of the amplified signal lights outputted from the optical amplifier 4. A signal light passing through the BPF 9 (i.e., the output light of the BPF 9) is supplied to the O/E converter 5.

Figure 8A:
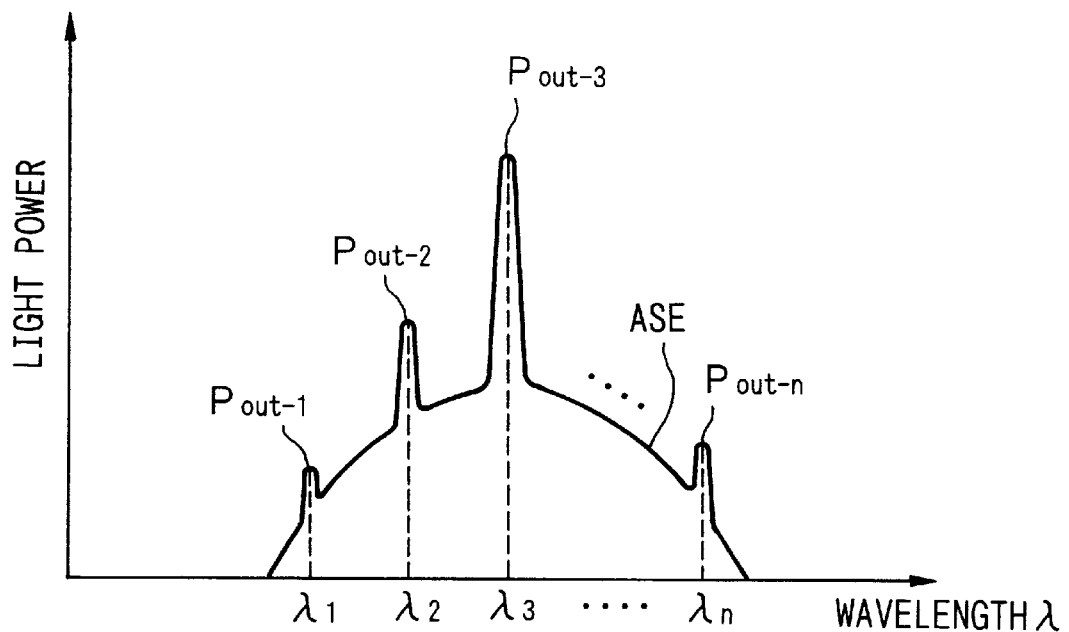
FIG. 8A shows wavelength spectrums of an output light of an optical band pass filter in the second preferred embodiment.

FIG. 8A shows wavelength spectrums of the wavelength multiplex signal light passing through the BPF 9. When the the output light of the optical amplifier 4 pass through the BPF 9, the levels of the wavelength spectrums of the output light are limited to very low except for a wavelength spectrum corresponding to a center wavelength of the pass band of the BPF as shown in FIG. 8A. Therefore, in the total signal power received by the O/E converter 5, the powers of the signal lights having the wavelengths out of the pass band of the BPF 9, are decreased. Furthermore, the wavelength band of the ASE light supplied to the O/E converter 5 is reduced. Therefore, the electric power which corresponds to the ASE light is also reduced.

Figure 8B:
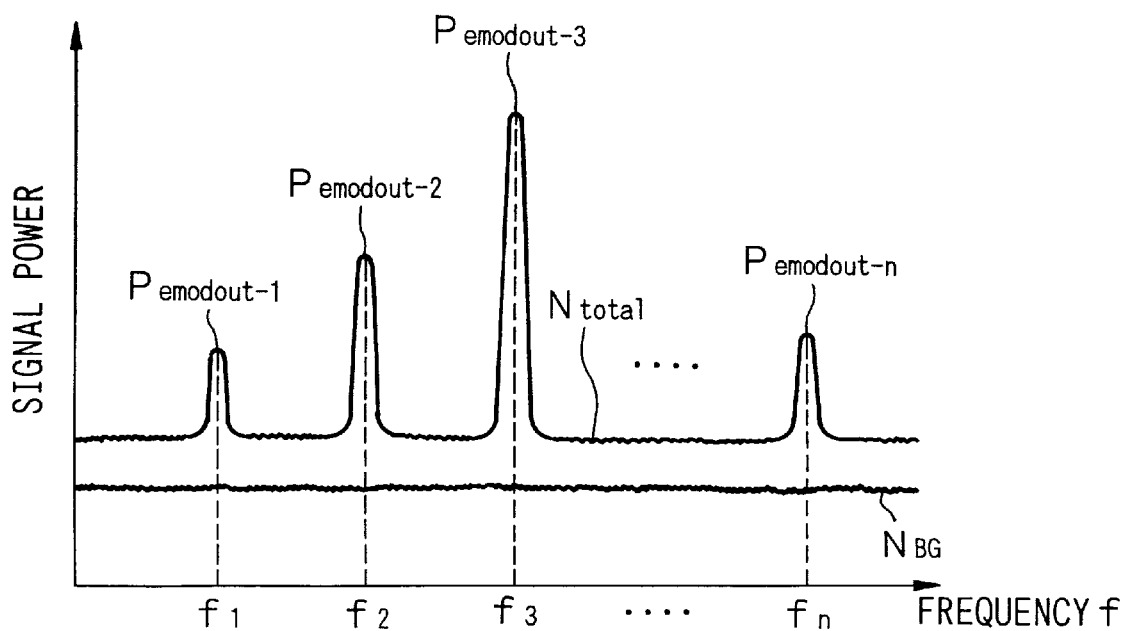
FIG. 8B shows frequency spectrums of a signal power of the output light of the optical band pass filter.

FIG. 8B shows frequency spectrums of the output signal of the O/E converter 5 which are detected by the frequency discriminating and power detecting device 6. In the modulation signal powers $P_{emodin-1}, P_{emodin-2}, \ldots, P_{emodin-n}$ detected by the frequency discriminating and power detecting device 6, the powers of frequency spectrums corresponding to the wavelength spectrums which are out of the pass band of the BPF 9 are limited as shown in FIG. 8B. As a result, powers of beat noises generated by mixing of different spectrums of the ASE light and by mixing of signal lights and spectrums of the ASE light, and powers of the signal lights having wavelengths out of the pass band are reduced in the total noise. Therefore, a reduced total noise power is detected by the frequency discriminating and power detecting device 6.

In actual wavelength multiplex light transmitting devices, light receivers are provided for the signal lights of the transmitted wavelength multiplex signal light and optical BPFs are respectively provided in the input sides of the light receivers to pass the signal lights having desired wavelengths. In this configuration, each signal is received by one of the light receivers in order to reduce the beat noises between the different signal lights, and between the signal noise and the ASE light, the ASE lights having different wavelengths.

In the preferred embodiment, therefore, the gains and the noise figures of the wavelength multiplex amplification are determined wavelength by wavelength in a condition closed to that of the actual wavelength multiplex transmission system. The calculation of the noise figures are carried out according to the equation (17).

The second preferred embodiment described above may be modified in order to improve the performance. In a modified embodiment of the second preferred embodiment, TLSs are used instead of the light sources in the wavelength multiplex signal light generator 8. Narrow band optical BPF (OTF), the center wavelength of the pass band of which can be controlled to a desired wavelength, are provided instead of the BPF 9. When changing the wavelength of one of the signal lights generated by the TLSs, the center wavelength of the pass band of the OTF is automatically controlled so as to track in the wavelength of the signal light.

In this modified embodiment, it is possible to determine wavelength dependence characteristics of the gains and the noise figures of the optical amplifier 4.

C. Third Preferred Embodiment

FIG. 9 is a block diagram showing the configuration of a a noise figure evaluating device for wavelength multiplex amplification according to a third preferred embodiment of the present invention.

In FIG. 9, the wavelength multiplex signal light generated by the wavelength multiplex signal light generator 8 is supplied to the input terminal $4_{-1}$. The wavelength multiplex signal light thus supplied has signal lights respectively having different wavelengths $\lambda_1, \lambda_2, \ldots, \lambda_2$ and the intensities of the signal lights are respectively modulated by different modulation frequencies $f_1, f_2, \ldots, f_n$. The wavelength multiplex signal light is amplified by the optical amplifier 4.

The output light of the optical amplifier 4, which is a wavelength multiplex signal light, is supplied to a light divider 10 via the output terminal $4_{-2}$ and is thereby divided into signal lights having the different wavelengths. The signal lights thus divided are respectively converted to electric signals by O/E converters $5_{-1}, 5_{-2}, \ldots, 5_{-n}$.

Frequency discriminating and power detecting devices $6_{-1}, 6_{-2}, \ldots, 6_{-n}$ respectively detect modulation signal powers, the frequencies of which are $f_1, f_2, \ldots, f_n$, from the divided signal lights supplied thereto.

The other operation is as same as that of the above-described first preferred embodiment.

In the third preferred embodiment, an effect which is as same as that of the first preferred embodiment is obtained.

Figure 10:
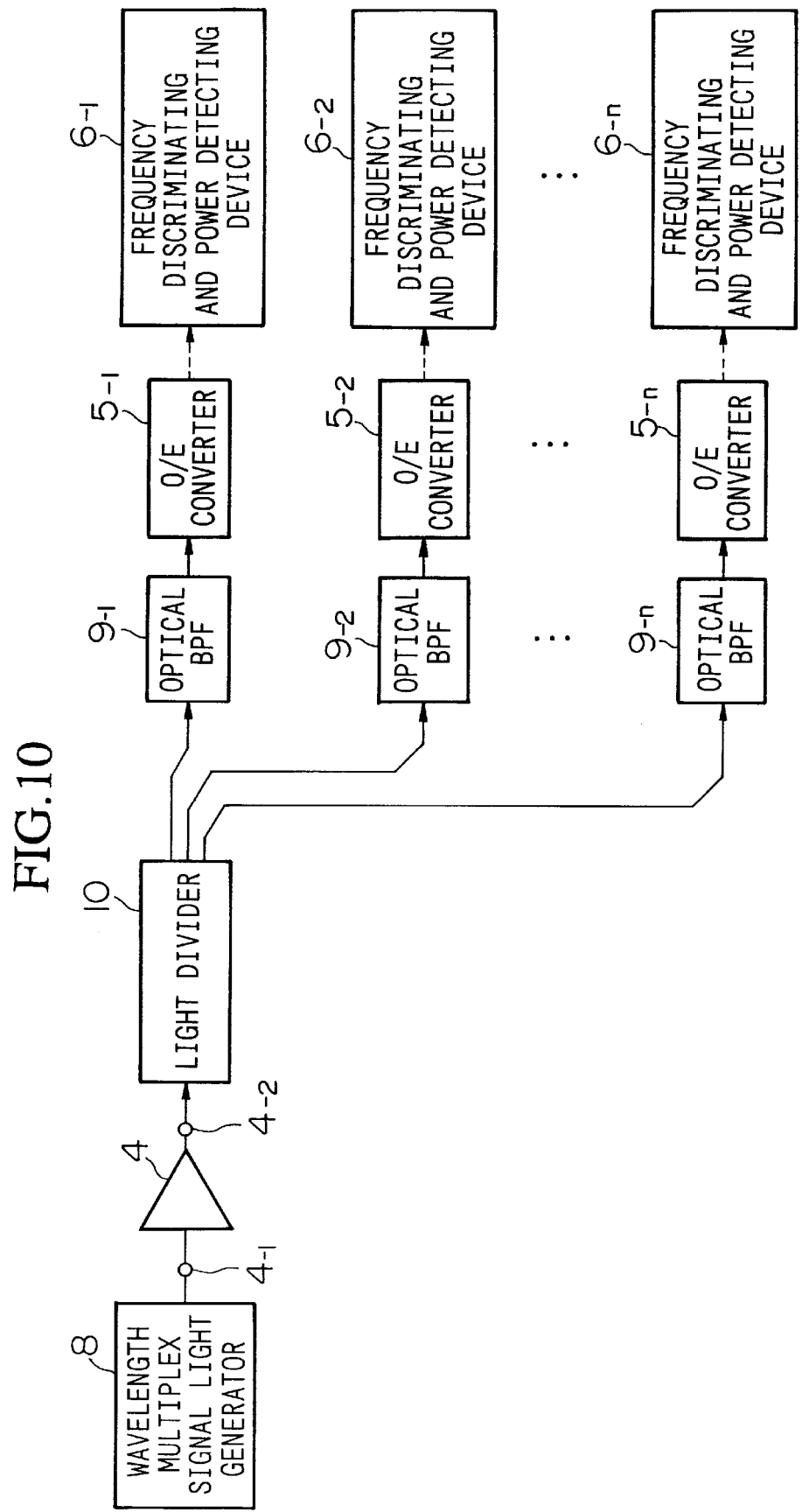
FIG. 10 is a block diagram showing the configuration of a modification of the third preferred embodiment of the present invention.

FIG. 10 shows a modification of the third preferred embodiment. In FIG. 10, the divided signal lights outputted from the light divider 10 respectively pass through optical BPFs $9_{-1}, 9_{-2}, \ldots, 9_{-n}$. The center wavelengths of the pass bands of these BPFs $9_{-1}, 9_{-2}, \ldots, 9_{-n}$ respectively correspond to the wavelengths $\lambda_1, \lambda_2, \ldots, \lambda_2$. The divided multiplex signal lights are respectively limited by these BPFs and the multiplex signal lights, the wavelength- band of which are limited by the BPFs, are respectively converted to electric signals by the O/E converters $5_{-1}, 5_{-2}, \ldots, 5_{-n}$.

In the modification, an effect which is as same as that of the second preferred embodiment is obtained.

D. Fourth Preferred Embodiment

Generally, erbium-doped optical fibers, which are amplification medium of optical fiber amplifiers, are product by doping erbium in the cores of single-mode optical fibers, the transmission characteristics of which are independent of the planes of polarization of the input light.

If light is inputted to an erbium-doped optical fiber for exciting the optical fiber and amplification phenomenon is thereby caused in the optical fiber, the amplification thus caused is independent of the plane of polarization of the input light.

Therefore, it is possible to constitute an erbium-doped optical fiber amplifier, the characteristics of which are independent of the plane of polarization of the input light, by combinating an erbium-doped optical fiber and an optical isolator or an optical filter, the characteristics of which are independent of plane of polarization of light. Studying or development is vigorously carried out at present for producing such an erbium-doped optical fiber amplifier.

On the other hand, there are other type of optical amplifiers, the amplification characteristics of which are dependent of the plane of polarization of the input light.

For example, there are optical fibers such as PANDA optical fibers, the transmission characteristics of which are dependent of the plane of polarization of the input light. If erbium is doped in the core of this type of optical fiber, it is possible to produce an erbium-doped optical fiber amplifier, the amplification characteristics of which are dependent of the plane of polarization of the input light.

In production of semiconductor laser amplifiers, active layer for amplifying light should be formed so that the thickness and the width of the layer have a same size. However, it is difficult to accurately adjust the width and the layer of the active layer. Therefore, the most semiconductor optical amplifiers product have the amplification characteristics dependent of the plane of polarization of the input light.

In these type of optical amplifiers, the gain of the amplification and the power of the output light are dependent of the plane of polarization of the input light. Furthermore, the ASE light outputted from the optical amplifier is dependent of the plane of polarization of the output surface of the amplifier.

If the waveform multiplex amplification is carried out by the optical amplifier described above and the gains and the noise figures of the amplification are to be evaluate, it is necessary to determine the gains or the ASE light powers which correspond to the plane of polarization of the amplified signal light obtained from the semiconductor optical amplifier.

The fourth preferred embodiment is to provide a noise figure evaluating device which can determine gains and noise figures of an optical amplifiers which has characteristics dependent of the plane of polarization of the input light.

Figure 11:
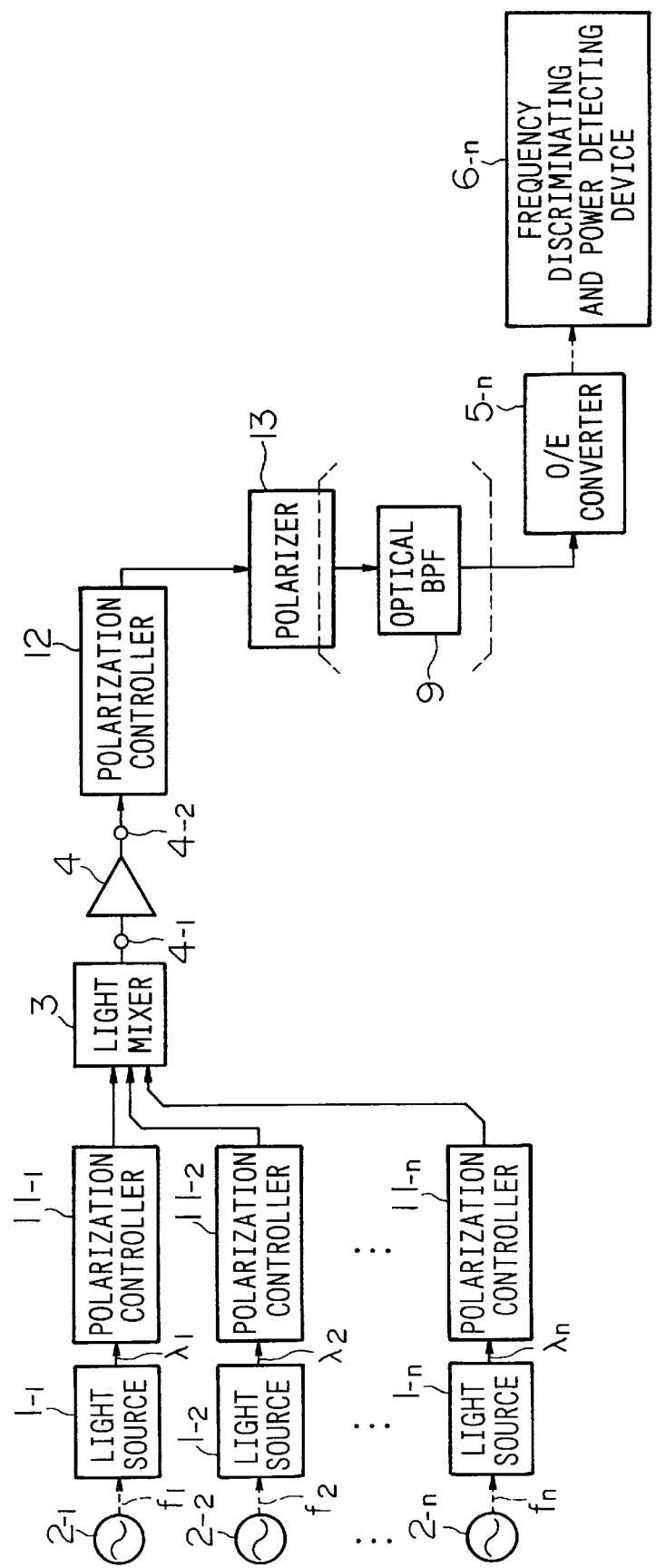
FIG. 11 is a block diagram showing a configuration of an optical amplifier evaluating device according to a fourth preferred embodiment of the present invention.
Figure 12A:
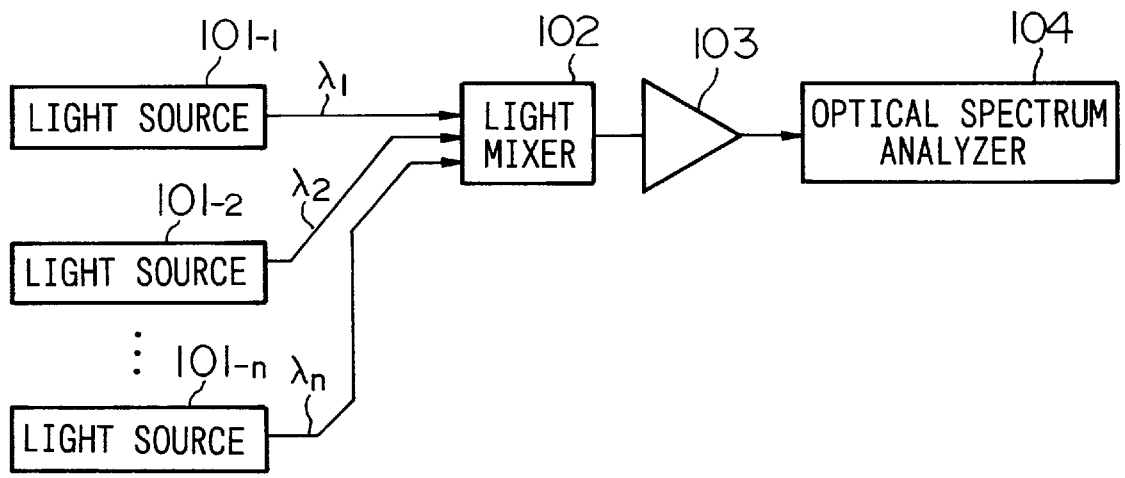
FIG. 12A is a block diagram showing a configuration of an optical amplifier evaluating system according to a background art.
Figure 12B:
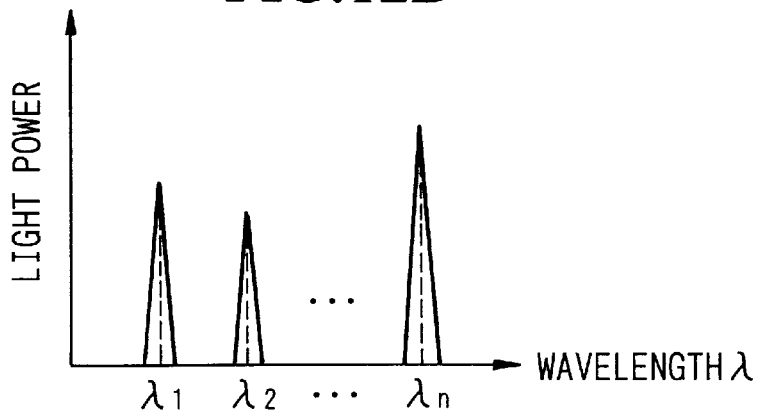
FIG. 12B shows wavelength spectrums of an wavelength multiplex signal light supplied to an optical amplifier to be evaluated.
Figure 12C:
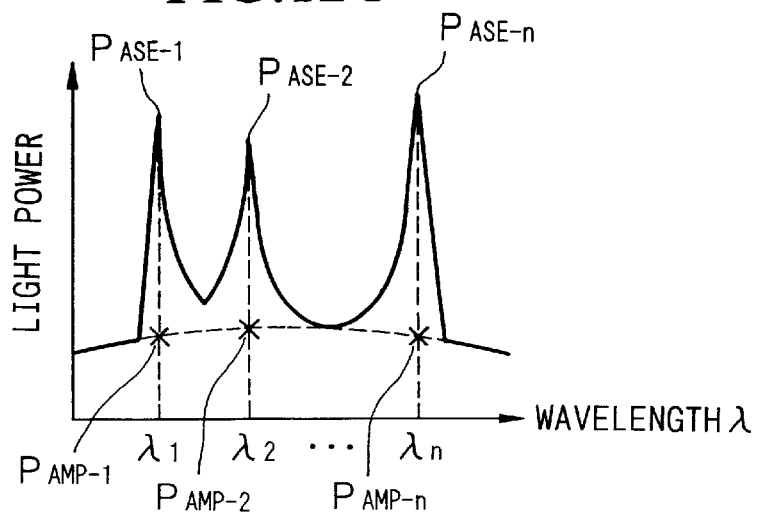
FIG. 12C shows wavelength spectrums of an output light of the optical amplifier.
Figure 13A:
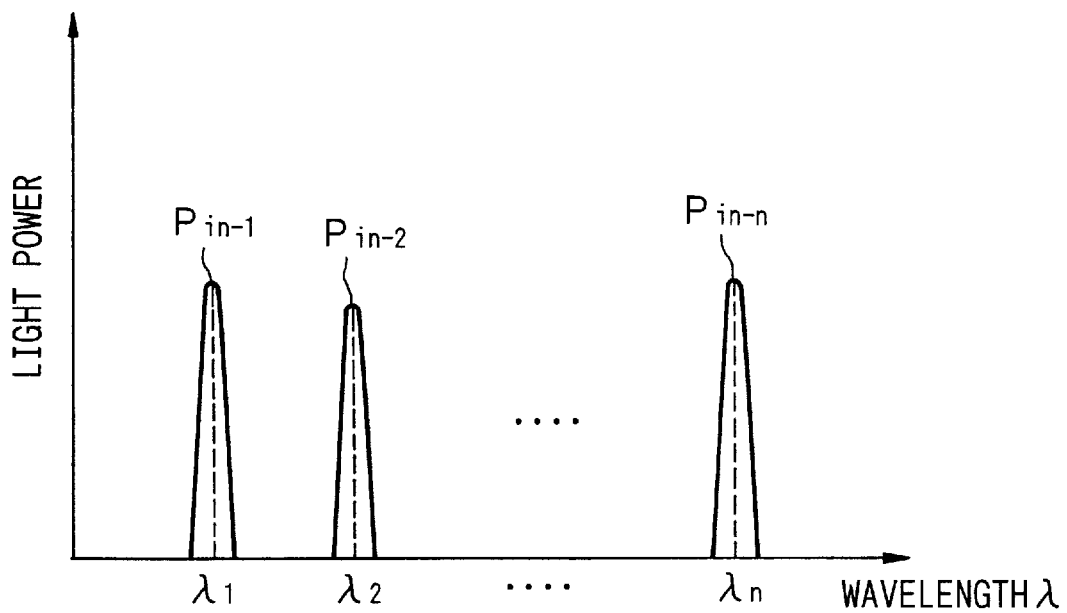
FIG. 13A shows wavelength spectrums of a light power of an input light of the optical amplifier.
Figure 13B:
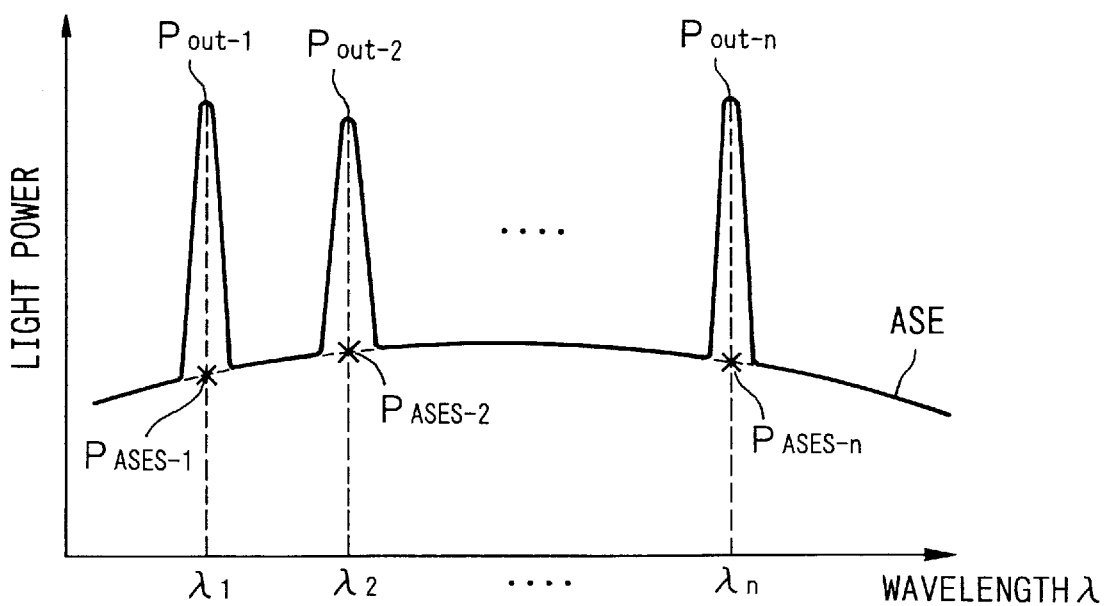
FIG. 13B shows wavelength spectrums of a light power of an output light of the optical amplifier.
Figure 14:
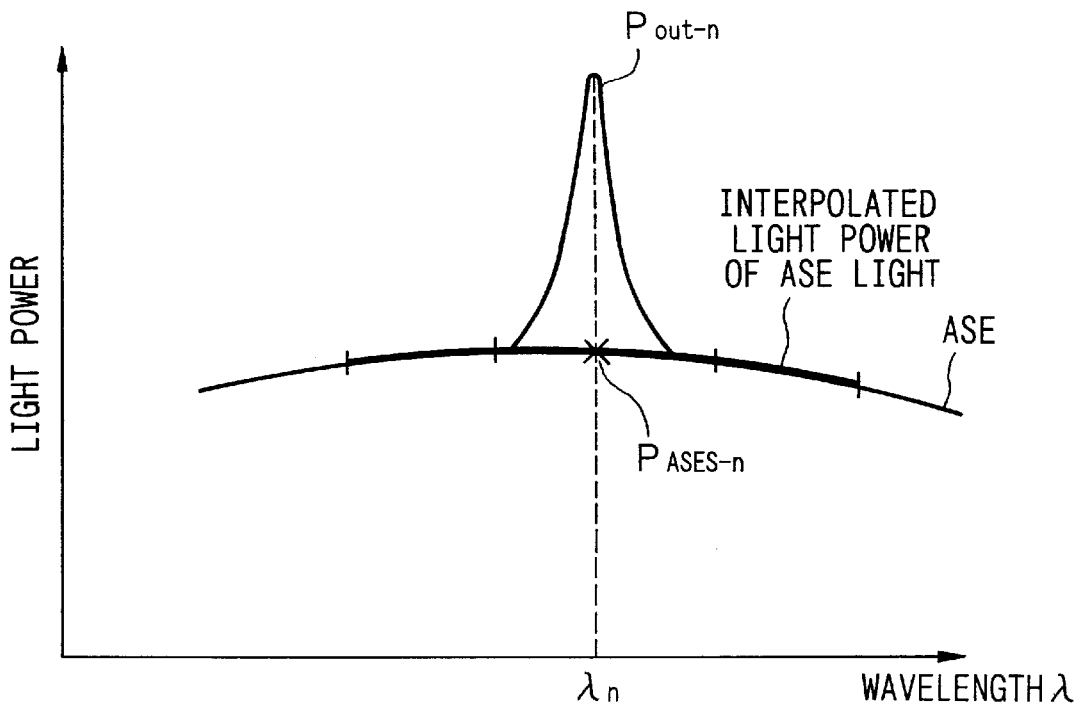
FIG. 14 shows an interpolation of a power of an wavelength spectrum of an ASE light outputted from the optical amplifier.
Figure 15:
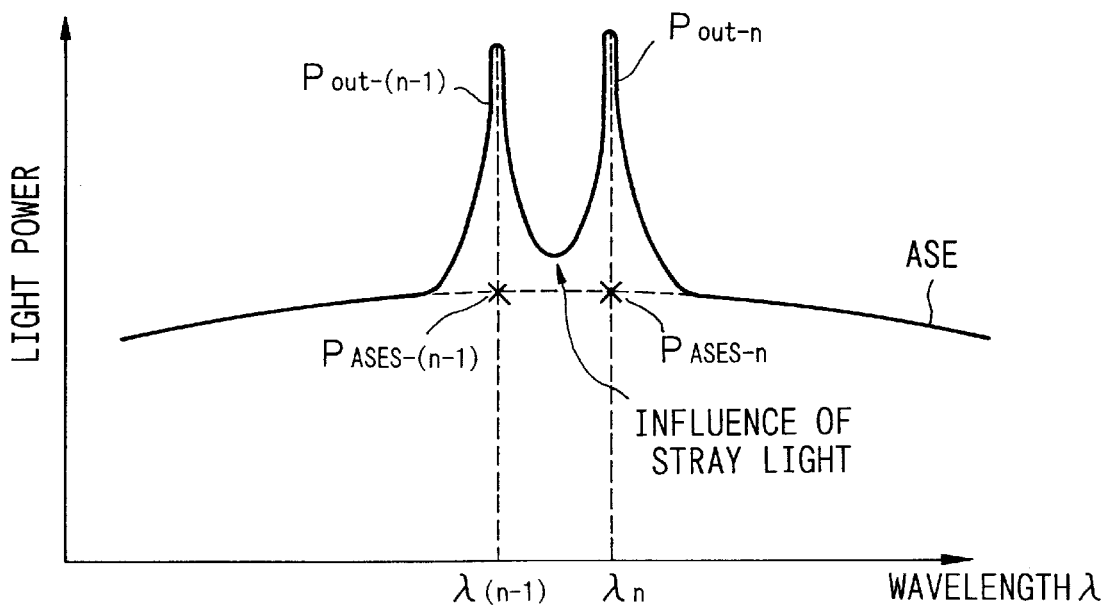
FIG. 15 shows an influence of a stray light in the background art.

FIG. 11 is a block diagram showing the configuration of the fourth preferred embodiment.

In FIG. 11, light sources $1_{-1}, 1_{-2}, \ldots, 1_{-n}$ output signal lights having different wavelengths and the intensities of the signal lights are respectively modulated by different modulation frequencies. The signal lights thus generated are respectively supplied to polarization controllers $11_{-1}, 11_{-2}, \ldots, 11_{-n}$ and the planes of polarization of the signal lights are thereby respectively controlled. Therefore, it is possible to control the planes of polarization of the signal lights so that the all signal lights have a same plane of polarization or so that one of the signal lights have a plane of polarization different from those of the other signal lights.

The signal lights outputted from the polarization controllers $11_{-1}, 11_{-2}, \ldots, 11_{-n}$ are mixed by the light mixer 3 to generate a wavelength multiplex signal light. The wavelength signal light is supplied to the input terminal $4_{-1}$ of the optical amplifier 4, the noise figures of which are to be determined. This optical amplifier 4 has a dependence of amplification characteristics on the plane of the polarization of the input light.

The wavelength multiplex signal light is amplified by the optical amplifier 4 and the output light of the optical amplifier 4 is outputted from the output terminal $4_{-2}$. The output light includes amplified signal lights and an ASE light which are generated by the spontaneous emission of the amplification medium of the optical amplifier. The amplified signal lights have different wavelength and the planes of polarization of them correspond to those of the input signal lights of the light mixer 3 which have been respectively controlled by the polarization controllers $11_{-1}, 11_{-2}, \ldots, 11_{-n}$. In contrast, the ASE light includes spectrums in a broad band. The spectrums have irregular planes of polarization or a plane of polarization peculiar to the optical amplifier 4.

The output light of the optical amplifier 4 is supplied to the O/E converter 4 via a polarization controller 12 and a polarizer 13.

The polarization controller 12 controls the plane of polarization of the output light of the optical amplifier 4. As described above, the output light of the optical amplifier 4 includes the amplified signal lights having the planes of polarization which have been respectively controlled by the polarization controllers $11_{-1}, 11_{-2}, \ldots, 11_{-n}$ and the ASE light having irregular planes of polarization or an peculiar plane of polarization. The planes of polarization of the lights included in the output light of the optical amplifier 4 are rotated by the polarization controller 12.

The polarizer 12 has a fixed plane of polarization.

The planes of polarization of the output light of the optical amplifier 4 is controlled so that the a light having a desired plane of polarization is supplied to the O/E converter $5_{-n}$ at a maximum intensity. Such a control is easily performed by controlling the rotation angle of the plane of polarization applied to the input light so that the intensity of the output light of the polarization controller 12 becomes a peak.

The output light of the polarizer 13 is converted to an electric signal by the O/E converter $5_{-n}$. The frequency discriminating and power detecting device $6_{-n}$ detects a signal power of a signal which is included in the electric signal and has a frequency corresponding to one of the modulation frequencies of the multiplexed signal lights.

The signal powers are detected for the multiplexed signal light wavelength and wavelength. The gains and the noise figures of the wavelength multiplex amplification by the optical amplification 4 are determined based on the detected results.

In the preferred embodiment, it is possible to determine the dependence of the gain and the noise figures of the optical amplifier 4 on the planes of polarization of the input light or the output light.

In a modification of the preferred embodiment, an optical BPF 9 is inserted between the polarizer 13 and the O/E converter $5_{-n}$. The center wavelength of the pass band of the BPF 9 corresponds to one of the wavelengths of the amplified signal lights.

In this modification, the gains and noise figures of the wavelength amplification closed to those of the actual wavelength multiplex light transmission device are determined.

E. Modification Of Above Preferred Embodiments

The computing device may be directly connected to the output terminal of the frequency discriminating and power detecting device. In this modification, the gains and noise figures of the wavelength multiplex amplification are automatically determined.

In another configuration, the parameters detected by the frequency discriminating and power detecting device may be stored in a storage medium such as a floppy disk, and the parameters thus stored may be read out by the computing section.

What is claimed is:

1. An optical amplifier evaluating device, comprising:
   light generating means for generating a wavelength multiplex signal light which includes a plurality of signal lights having different wavelengths and having intensity envelopes modulated by different modulation frequencies which have a sufficiently shorter period than an atom life time in a high energy level or a carrier life time in an amplification medium of an optical amplifier to be evaluated, and for supplying the wavelength multiplex signal light to the optical amplifier;
   O/E conversion means for converting an output light of the optical amplifier to an electric signal; and
   frequency discriminating and power detecting means for detecting signal powers of frequency spectrums which are included in the electric signal and respectively correspond to the modulation frequencies of the signal lights, and for detecting a noise power of the electric signal at a frequency band which is separate from the modulation frequencies, and for outputting the signal powers and the noise power as parameters for evaluating gains and noise figures of wavelength multiplex amplification by the optical amplifier.

2. An optical amplifier evaluating device according to claim 1, further comprising computing means for determining gains and noise figures of a wavelength multiplex amplification by the optical amplifier wavelength by wavelength based on the signal powers and the noise power detected by the frequency discriminating and power detecting means.

3. An optical amplifier evaluating device according to claim 2, wherein the wavelength multiplex signal light generating means includes a plurality of light sources which generates said signal lights, and the computing means corrects the noise power based on relative intensity noises of the light sources when determining the noise figures.

4. An optical amplifier evaluating device according to claim 1, wherein the wavelength multiplex signal light generating means comprises a plurality of light sources for generating signal lights having different wavelengths; a plurality of modulation signal generator for supplying modulation signals having different frequencies to the light sources to modulate intensities of the signal lights, and a light mixer for mixing the signal lights to generate an wavelength multiplex signal light.

5. An optical amplifier evaluating device according to claim 1, wherein the wavelength multiplex signal light generating means comprises a plurality of light sources for generating signal lights having different wavelengths; a plurality of modulation signal generator for generating modulation signals having different frequencies; a plurality of light modulators for respectively modulating intensities of the signal lights based on the modulation signals, and a light mixer for mixing the modulated signal lights to generate an wavelength multiplex signal light.

6. An optical amplifier evaluating device according to claim 1, further comprising an optical band pass filter inserted between the optical amplifier and the O/E conversion means, the optical band pass filter, wherein a center wavelength of a pass band of the optical band pass filter corresponds to one of the wavelengths of the signal lights.

7. An optical amplifier evaluating device according to claim 1, further comprising light dividing means for dividing the output light into signal lights having different wavelengths, wherein the O/E conversion means comprises a plurality of O/E converter for converting the divided signal lights to electric signals, and the frequency discriminating and power detecting means comprises a plurality of frequency discriminating and power detecting sections, each one of which receives each one of the electric signals, and detects the signal power of a frequency spectrum which is included in the received electric signal and corresponds to the modulation frequency of one the signal lights, and detects a noise power of the electric signal at a frequency band which is apart from the modulation frequencies, and for outputting the signal power and the noise power as parameters for evaluating gains and noise figures of an wavelength multiplex amplification by the optical amplifier.

8. An optical amplifier evaluating device according to claim 1, further comprising polarization control means for controlling planes of polarization of the signal lights constituting the wavelength multiplex signal light supplied to the optical amplifier; and selecting means for selecting component corresponding to a desired plane of polarization from the output light of the optical amplifier, and for supplying the selected component to the O/E conversion means.

9. An optical amplifier evaluating method comprising the steps of:
   generating a wavelength multiplex signal light which includes a plurality of signal lights having different wavelengths and having intensity envelopes modulated by different modulation frequencies which have a sufficiently shorter period than an atom life time in a high energy level or a carrier life time in an amplification medium of an optical amplifier to be evaluated;
   supplying the wavelength multiplex signal light to the optical amplifier;
   converting an output light of the optical amplifier to an electric signal;
   detecting signal powers of frequency spectrums which are included in the electric signal and respectively correspond to the modulation frequencies of the signal lights;
   detecting a noise power of the electric signal at a frequency band which is separate from the modulation frequencies; and
   determining gains and noise figures of wavelength multiplex amplification by the optical amplifier based on the signal powers and the noise power wavelength by wavelength.

10. An optical amplifier evaluating method according to claim 9, further comprising a step of correcting the noise power based on relative intensity noises of light sources which generates the signal lights.

11. An optical amplifier evaluating method according to claim 9, further comprising the step of carrying out a band pass filtering operation on the output light of the optical amplifier, wherein a center wavelength of a pass band of the band pass filtering operation corresponds to one of the wavelengths of the signal lights.

12. An optical amplifier evaluating method according to claim 9, further comprising the steps of controlling planes of polarization of the signal lights constituting the wavelength multiplex signal light supplied to the optical amplifier; and selecting component corresponding to a desired plane of polarization from the output light of the optical amplifier as a signal light which is to be converted to the electric signal.

* * * * *